United States Patent [19]
Berger

[11] 3,950,007
[45] Apr. 13, 1976

[54] LOADING VEHICLE

[76] Inventor: Gunvald Magnus Svante Berger, Helmfeltsgatan 4 A, S-211 48 Malmo, Sweden

[22] Filed: Feb. 26, 1975

[21] Appl. No.: 553,273

[30] Foreign Application Priority Data
Feb. 26, 1974 Sweden .............................. 74025073

[52] U.S. Cl. ......................... 280/124 R; 180/24.02
[51] Int. Cl.² ........................................... B60S 9/10
[58] Field of Search ......... 280/124 R, 124 F, 150.5, 280/150 A; 180/24.02

[56] References Cited
UNITED STATES PATENTS

| | | | |
|---|---|---|---|
| 2,974,976 | 3/1961 | Lyall | 280/124 |
| 3,398,972 | 8/1968 | Ekengard | 280/150.5 |
| 3,436,095 | 4/1969 | Preston | 280/150.5 |

Primary Examiner—Philip Goodman
Attorney, Agent, or Firm—Oblon, Fisher, Spivak, McClelland & Maier

[57] ABSTRACT

A loading vehicle provided with a chassis and a carrying frame for at least one load carrier and a compression device for the springs forming at least a part of the spring system which carries a wheel shaft on the vehicle, wherein the compression device includes a moveable actuating device which, when actuated, transfers a force to the springs to compress them so that the carrying frame will be moved towards the wheel shaft, being characterized by the carrying frame consisting of a part of the vehicle chassis or being coupled to the chassis independent of the compression device, and having a lifting device forming a part of the compression device which, when activated, is arranged to lift the chassis and the carrying frame therewith, such that the carrying frame will take a predetermined height in relation to the ground essentially independent of the weight of the load carried by the carrying frame.

9 Claims, 4 Drawing Figures

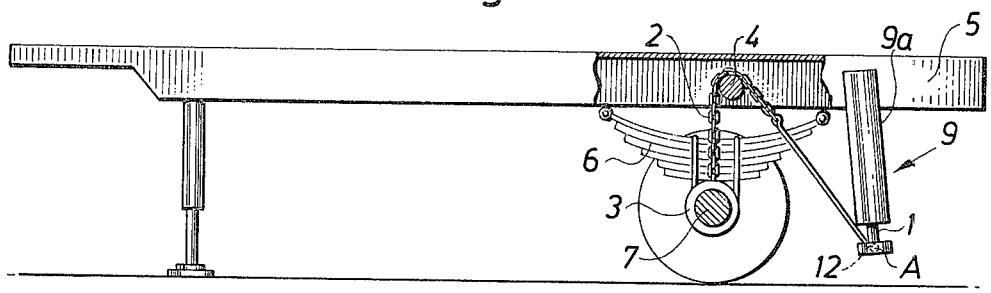
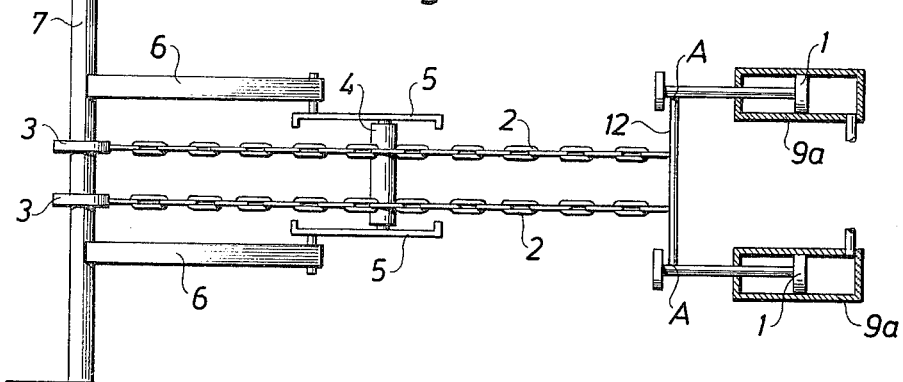
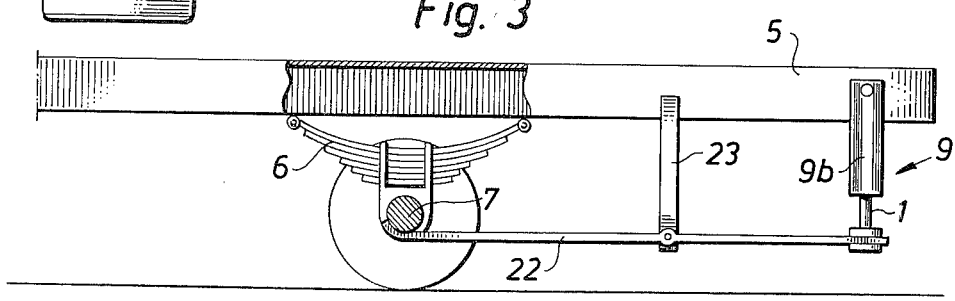
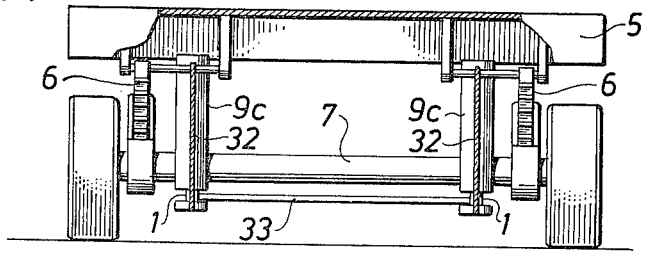

LOADING VEHICLE

BACKGROUND OF THE INVENTION

The present invention relates to a loading vehicle which is provided with a carrying frame for at least one load carrier and a compression device for the spring or springs forming at least a part of the spring system which carries at least one wheel shaft on the vehicle, said compression device comprising a movable actuating device which, when actuated, transfers a force to the springs in order to compress them so that the carrying frame will be moved towards the wheel shaft.

A loading vehicle of this kind is previously known wherein the spring compression device consists of two chains one end of which being fastened to a special, separate carrying frame and the other end of which being connected to the rear wheel shaft of the vehicle via intermediate means. When the springs are to be compressed the separate carrying frame is pivoted to a position at a distance from the chassis by means of a piston in a hydraulic cylinder on the chassis. When the hydraulic cylinder is actuated the chains are stretched so that the springs will be compressed. A locking device can be actuated to hold the springs in their compressed condition. The main disadvantage with this vehicle is that a special, separate carrying frame must be provided in order to compress the springs.

Spring compression devices for vehicles are also known where the vehicle plate springs are compressed in order to permit the vehicle to be driven in under a load carrier, such as a container, supported by legs thereon. If this load carrier is too heavily loaded the plate springs can not raise the load carrier when the spring force is released again which means that the legs can not be removed from their engagement with the ground. Nor can the carrying frame, and therewith the load carrier, be raised or lowered relatively to the ground, independent of the weight of the load, in order that it shall take a position which is adapted to the height of the wharfs with which the load carrier cooperates during loading and unloading operations.

SUMMARY OF THE INVENTION

The object of the present invention is to eliminate the disadvantages with known devices and to provide a simple and inexpensive loading vehicle the spring compression device of which having no connection with a special, separate carrying frame on the chassis, which permits the carrying frame to be designed in one piece with the chassis or can be omitted to its entirety This means that the weight of the vehicle decreases while the structural strength remains unaltered (of course, a special carrying frame can be arranged on the vehicle according to the invention but since this frame is coupled to the chassis independently of the compression device it can be tippable or can be removed from the vehicle if desired). Further, according to the invention the load carrier can in a simple manner be moved to take a height over the ground which is adapted to the heights of different wharfs, and the legs of the load carrier standing on the ground can be removed from their engagement with the ground even if the force of the springs is not sufficiently high to lift the load carrier from the ground.

BRIEF DESCRIPTION OF THE DRAWINGS

The embodiments of the invention will now be described in connection with the enclosed drawings on which FIG. 1 is a schematic side view of the loading vehicle according to the invention, FIG. 2 is a schematic, extended top view of the vehicle according to FIG. 1, FIG. 3 is a schematic side view of the vehicle according to FIGS. 1 and 2 but including a modified spring compression device, and FIG. 4 is a schematic view from behind of the vehicle according to FIGS. 1 and 2 but including a modified spring compression device.

DETAILED DESCRIPTION OF THE ILLUSTRATED EMBODIMENTS

In FIG. 1 is shown a vehicle in the form of a trailer. Loading and unloading of a load carrier on this trailer is performed in a known manner. The rear end of the trailer is provided with two downwardly extending jacks 9, each one comprising an hydraulic cylinder 9a welded to the chassis 5. A piston 1 is movable in a vertical direction in each cylinder. The lower parts of the pistons, which are enlarged to form plates, are connected to each other, at A, by means of a rod 12 to which two chains 2 are fastened. The other ends of chains 2 are connected to clamps 3 around the rear wheel shaft 7 of the trailer. On the two sides of the chassis two rollers 4 are fastened which support the chains and permit them to run thereon.

The procedure for the lifting and lowering of the carrying frame or chassis 5 will now be described briefly. The Figures show the trailer when its plate springs are not affected by the compression device and when the trailer does not carry any load carrier.

By means of a conventional electric pump, not shown, hydraulic fluid is pumped into the cylinders 9a, thereby pressing the pistons 1 downwards. Chains 2 will first be somewhat stretched and will then transfer a force to clamps 3 resulting in that the rear wheel shaft 7 will be lifted, whereby the plate springs 6 are compressed. Essentially simultaneously with the compression of the springs the chassis or frame 5 will be lifted because the lower parts of pistons 1 are pressed against the ground. Thereafter springs 6 are locked in their compressed condition by means of a conventional locking device (not shown). Hereafter, the pump is activated so that pistons 1 are returned to the position shown in FIG. 1, i.e. from their engagement with the ground. The trailer is then driven backwards under a load carrier, not shown, standing on four legs on the ground, and the lifting of this load carrier is performed by activating the pump again so that the lower parts of pistons 1 will engage the ground. The legs of the load carrier can then be removed or turned aside. Thereafter, the locking device for springs 6 are released and the pump is activated once again in order to restore pistons 1 to the position shown in FIG. 1 so that the load carrier will rest on the carrying frame or chassis 5 and the springs 6 will function in a normal manner. In order that the springs shall function satisfactorily chains 2 should be somewhat slack during driving.

In FIG. 3 there is schematically shown another embodiment of the device according to the invention. Instead of the chains 2 shown in FIGS. 1 and 2, a lever 22 is connected to the lower part of each piston 1.

Cylinders 9b are turnably connected to the frame or chassis 5 and correspond to cylinders 9a in FIGS. 1 and 2. A downwardly extending arm 23 is connected to each side of the frame or chassis 5, and levers 22 are turnably connected to the lower ends of arms 23 at a predetermined distance from pistons 1. The ends of levers 22 not connected to pistons 1 bear against the underside of wheel shaft 7. When the pistons 1 are forced downwards the last mentioned ends on levers 22 will press wheel shaft 7 upwards so that the springs 6 will be compressed and the frame or chassis 5 will be lifted as a result of the engagement between pistons 1 and the ground. For the rest the described device functions in essentially the same manner as does the device shown in FIGS. 1 and 2.

IN In 4 there is schematically shown a third embodiment of the device according to the invention. Two hydraulic cylinders 9c are in a sitable manner fixed to the wheel shaft 7 adjacent springs 6, and their pistons 1 are directed towards the ground. In the downwards directed end of each piston 1 two wires 32 are fastened (only one wire is shown for each piston). The other ends of wires 32 are fastened at the springs 6 where they are coupled to the carrying frame 5. A stiff bar 33 is connected between the lower ends of pistons 1 in order to increase stability of the device. When pistons 1 receive a downwards directed movement, they will engage the ground and lift the carrying frame 5. Essentially simultaneously therewith, the wires 32 will be stretched, whereby the wheel shaft 7 is forced upwards contemporary with the compression of springs 6. Otherwise, the described device functions in essentially the same manner as does the device shown in FIGS. 1 and 2.

The embodiments shown and described above are only examples of how the invention can be carried into effect, and the invention is therefore not limited to these embodiments. For instance, in stead of the combined device, including a spring compression device and a lifing device, the spring compression device can be separated from the lifting device which then can consist of a separate piston-cylinder device engaging the ground or acting between the wheel shaft and the frame or chassis, and the spring compression device can therefore be designed in a conventional manner.

The invention is, therefore, only limited by that which is stated in the following claims.

What is claimed is:

1. A loading vehicle provided with a chassis and a carrying frame for at least one load carrier and a compression device for the spring or springs forming at least a part of the spring system which carries at least one wheel shaft on the vehicle, said compression device comprising a moveable actuating device which, when actuated, transfers a force to the springs in order to compress them so that the carrying frame will be moved towards the wheel shaft, characterized by the carrying frame being a part of the vehicle chassis or being coupled to the chassis independent of the compression device, and by a lifting device coupled to the compression device or forming a part thereof which, when activated, is arranged to lift the chassis, and therewith the carrying frame, so that the carrying frame will take a pre-determined height in relation to the ground essentially independent of the weight of the load carried by the carrying frame.

2. Vehicle according to claim 1, characterized in that the lifting device consists of at least one element which is movable in relation to the carrying frame and which, when activated, is arranged to engage the ground to lift the carrying frame.

3. Vehicle according to claim 2, characterized in that the lifting device comprises a piston-cylinder device the piston of which constituting the element engaging the ground.

4. Vehicle according to claim 3, characterized in that the piston is coupled to means activating the springs.

5. Vehicle according to claim 4, characterized in that said means consist of at least one chain or wire one end of which being connected to the piston and the other end of which being coupled to the wheel shaft.

6. Vehicle according to claim 5, characterized in that the chain is arranged to run over a pulley connected to the chassis and guiding the direction of movement of the chain.

7. Vehicle according to claim 4, characterized in that said means consist of at least one lever one end of which being coupled to the piston and the other end of which being coupled to the wheel shaft, and that at least one arm fastened to the chassis turnably carries the lever between its two ends.

8. Vehicle according to claim 4, characterized in that the means activating the springs consist of at least one chain or wire one end of which being connected to the piston and the other end of which being coupled to the carrying frame or to the ends of the springs which are coupled to the carrying frame.

9. Vehicle according to claim 3, whereby two cylinders and two pistons are arranged for each wheel shaft, characterized in that the ends of the pistons engaging the ground are coupled together by means of a stiff member.

* * * * *